Sept. 24, 1957  W. F. BRAUER ET AL.  2,807,697
BRAZING APPARATUS AND FLOATING WORK SUPPORT THEREFOR
Filed Dec. 29, 1954  2 Sheets-Sheet 1

INVENTORS
W. F. BRAUER
L. O. REICHELT
R. L. SURVER
BY C. D. Hamilton
ATTORNEY

Sept. 24, 1957 W. F. BRAUER ET AL 2,807,697
BRAZING APPARATUS AND FLOATING WORK SUPPORT THEREFOR
Filed Dec. 29, 1954 2 Sheets-Sheet 2
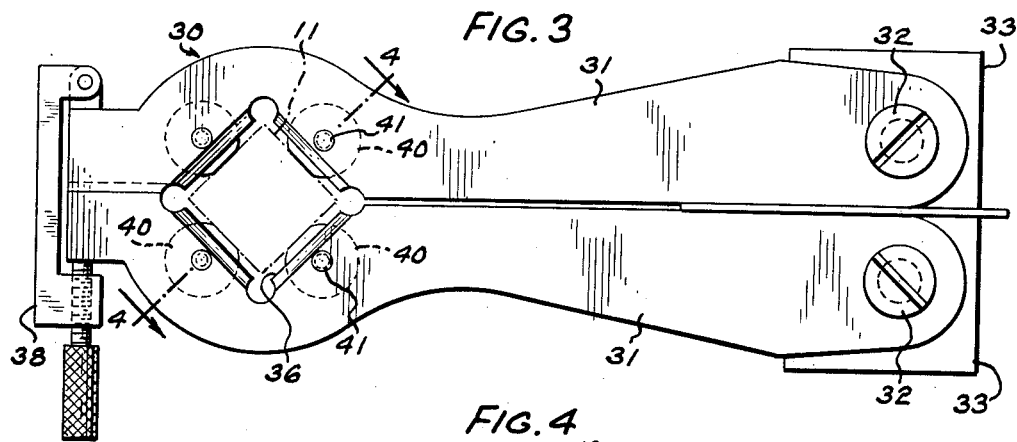
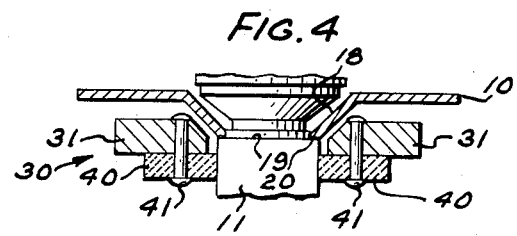
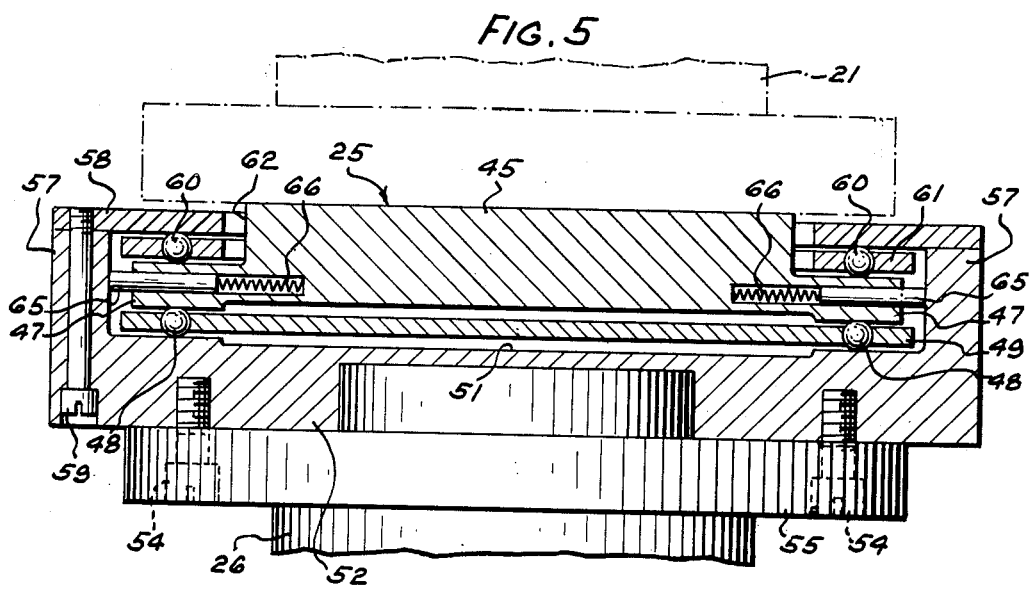
INVENTORS
W. F. BRAUER
L. O. REICHELT
R. L. SURVER
BY C. B. Hamilton
ATTORNEY

United States Patent Office 2,807,697
Patented Sept. 24, 1957

2,807,697

BRAZING APPARATUS AND FLOATING WORK SUPPORT THEREFOR

William F. Brauer, Chicago, Ill., and Lester O. Reichelt, St. Paul, and Robert L. Surver, White Bear Lake, Minn., assignors to Western Electric Company, Incorporated, New York, N. Y., a corporation of New York Application December 29, 1954, Serial No. 478,468

7 Claims. (Cl. 219—9.5)

This invention relates to brazing apparatus and more particularly to such apparatus having a coil provided with insulating means for holding a portion of the work in a predetermined alignment with and fixed relation to the coil and having a floating work support permitting movement of a portion of the work relative to the coil due to uneven expansion and contraction during the heating and cooling of the work.

An object of the invention is to provide a brazing apparatus having an induction heating coil and means for holding a portion of an article in a predetermined alignment with and fixed relation to the coil and having a floating holder for supporting the article for movement of a portion thereof relative to the coil during the heating and cooling of the article to prevent distortion of the article and damage to the coil.

Another object of the invention is to provide a floating work holder for supporting an article for horizontal movement caused by heat expansion while a portion of the article is being held in fixed position and brazed.

A device illustrating certain features of the invention may include a brazing apparatus with a split induction heating coil, the sections of which are movable from an open position to a closed position encircling a portion of the article to be brazed and which have insulating members thereon engageable with the article adjacent said portion to be brazed for holding it in centered alignment with and fixed relation to the coil during the brazing operation, and a floating work holder which is mounted on the apparatus below the coil for supporting the article for movement of the lower portion thereof due to uneven expansion and contraction of the article during the brazing and cooling thereof to prevent distortion of the article and damage to the insulating members on the coil.

Other objects and advantages of the invention will become apparent by reference to the following detailed description and the accompanying drawings illustrating a preferred embodiment thereof, in which—

Fig. 3 is an enlarged fragmentary plan view of the apparatus taken along the line 3—3 of Fig. 1 and showing the induction heating coil;

Fig. 4 is a cross-sectional view through the coil taken along the line 4—4 of Fig. 3; and Fig. 5 is an enlarged fragmentary vertical sectional view through the floating work holder and support therefor taken along the line 5—5 of Fig. 2.

Figure 1:
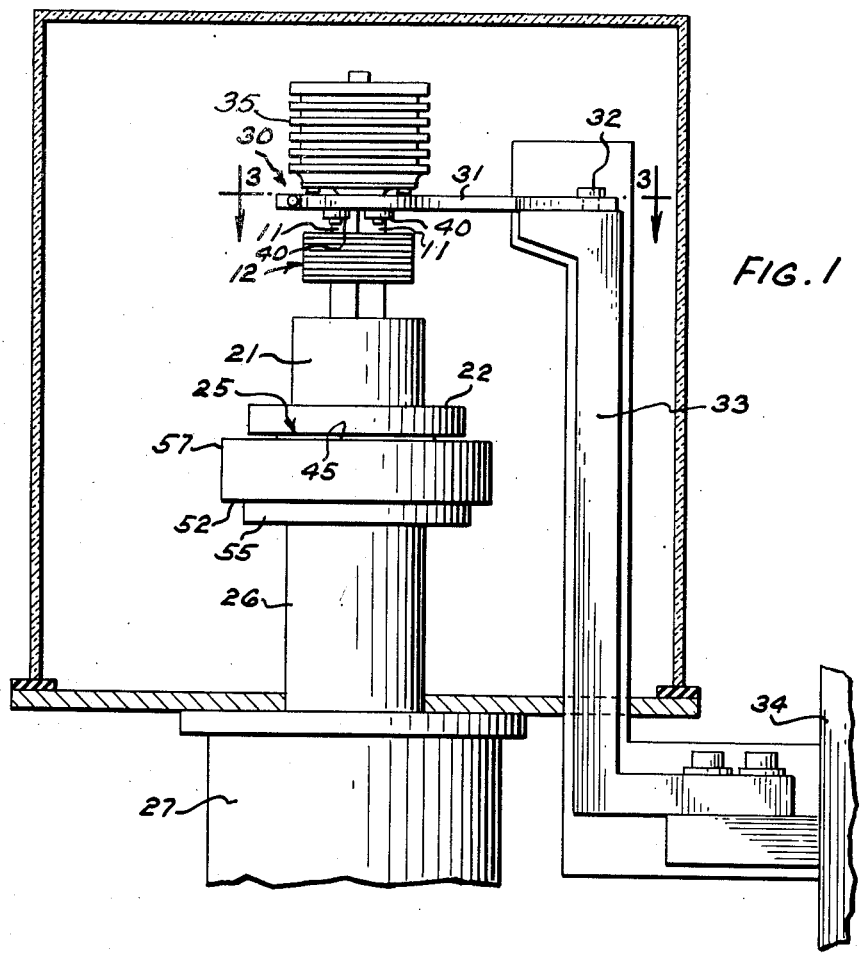
Fig. 1 is a fragmentary vertical sectional elevational view of an induction brazing apparatus showing the floating work holder therein.
Figure 2:
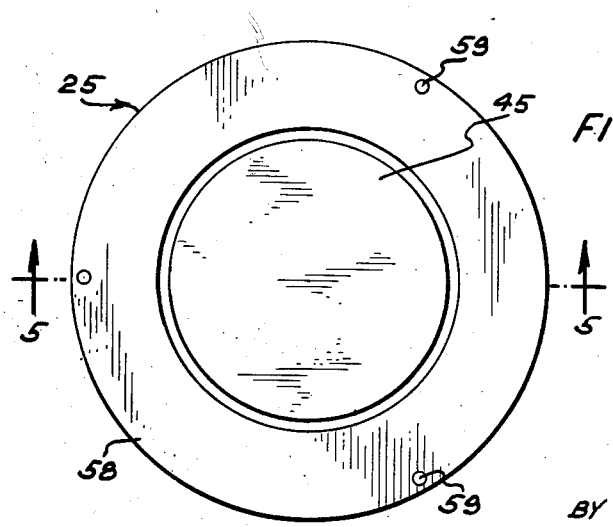
Fig. 2 is an enlarged plan view of the floating work holder.

The present device was designed to braze a mounting plate 10 (Figs. 1 and 4) to the end of a pole piece 11 of a magnetron electronic tube 12. The mounting plate 10 is centrally apertured and the annular portion 18 thereof seats on a shouldered portion 19 of the magnetron with a ring of solder 20 interposed therebetween and is adapted to be heated and brazed thereto. The magnetron 12 as shown herein is removably secured to a supporting member 21 having a flat lower plate 22 thereon for supporting the magnetron in upright position.

The magnetron 12 and the base 21 therefor is adapted to be supported on a floating work support or holder 25 which is mounted on the upper end of a piston 26. This piston is vertically reciprocable in a cylinder 27 of a fluid actuator for raising the work holder 25 and the magnetron 12 thereon from a lower position to an upper position (Fig. 1) with the magnetron in operative or welding relation to a split induction heating coil 30. The coil 30 has two coil sections 31 (Figs. 3 and 4) pivotally connected at 32 to the upper ends of a pair of vertical supporting conductor elements 33, which are mounted in insulated relation to each other and at their lower ends are connected to a high frequency current generating device 34. The coil sections 31 are movable from open to closed position and have recesses 36 which cooperate to form an opening for receiving portions of the upper pole piece 11 and the mounting plate 10 of the magnetron. The forward portions of the coil sections 31 have conforming surfaces adapted to be clamped in engagement with each other by a suitable clamping member 38. Each of the coil sections 31 has a pair of insulating members 40 of ceramic material secured by rivets 41 to the underside thereof with portions of the members 40 projecting inwardly from the recesses 36 and engageable with the side faces of the upper pole piece 11 for positioning and holding the upper portion of the magnetron in fixed and spaced relation to the coil 30 during the brazing operation.

The coil sections 31 and the conductor elements 33 may have conduits (not shown) associated therewith for circulating coolant therethrough and means may be provided for cooling the magnetron 12 during the brazing operation and the mounting plate 10 may be cooled by placing a hollow cylindrical block 35 thereon provided with annular cooling fins.

Any movement of the lower portion of the magnetron 12 due to uneven expansion and contraction of different parts thereof during the brazing and the cooling of the magnetron will be permitted by the floating work holder 25 while the upper portion will be held in alignment with the coil 30 and against horizontal movement by the insulating ceramic members 40, thereby effecting the brazing of the magnetron components without distortion of the ceramic members 40 or distortion of the magnetron.

The floating work holder 25 comprises a movable work supporting member in the form of a round plate 45 having a flat upper surface or seat on which the magnetron tube 12 and the magnetron supporting member 21 are supported and having an annular flange 47 extending laterally from the lower portion thereof. The flange portion of the movable plate 45 rests on a plurality of ball bearings 48 arranged in a circle and retained in spaced relation to each other by a retaining disc 49. The ball bearings 48 rest on the upper flat surface 51 of a base 52 of the work holder 25 which is secured by a plurality of screws 54 to a flange 55 of the piston 26. A cylindrical wall 57 extends upwardly from the edge portion of the base 52 in spaced relation to the outer periphery of the flange 47 and retaining disc 49 and serves to limit the horizontal movement of the movable plate 45. An apertured retaining disc or ring 58 is secured to the upper portion of the cylindrical wall 57 by a plurality of screws 59 and engages a plurality of ball bearings 60 interposed between the ring 58 and the flange 47 for preventing upward displacement of the movable plate 45. The bearings 60 are arranged in a circle and are retained in a position by a retaining ring 61. Clearance is provided between the cylindrical surface 62 of the movable plate and the inner periphery of the rings 58 and 61 and between the inner periphery of the cylindrical walls 57 and the annular flange 47 and the retaining ring 61 and retaining disc 49 to permit a predetermined horizontal movement of the movable plate 45 relative to the housing 53 of the floating work holder 25. To yieldably maintain the movable plate 45 in a normal centralized position on the base 52 and to return it to this position a plurality of radially disposed pins 65 are slidably mounted in recesses in the flange 47 of the movable plate 45 and are urged outwardly into engagement with the cylindrical wall 57 by springs 66.

From the above description it will be seen that with the present apparatus a work piece (magnetron 12 with the mounting plate 10 and solder ring 20) is placed on the work holder 25 in its lowered position and is then raised by the piston 26 to its upper position between the open coil sections 31 which are then moved to and locked in closed position with the insulating members 40 locating and holding the upper portion of the work piece in a predetermined position within and in spaced relation to the coil. High frequency current is then passed through the coil to heat the upper portion of the work piece and effect the brazing of the components thereof and during the heating and brazing of the work piece the lower end thereof is free to move horizontally with the plate 45 during uneven heat expansion and contraction of portions of the work piece and thus prevent destruction of the ceramic insulating members 40 and distortion of the work piece.

It is to be understood that the above-described arrangements are simply illustrative of the application of the principles of this invention. Numerous other arrangements may be readily devised by those skilled in the art which will embody the principles of the invention and fall within the spirit and scope thereof.

What is claimed is:

1. In a brazing apparatus, the combination of an induction heating coil for heating one portion of a work piece, a work holder engageable with another portion of said work piece for supporting said work piece within said coil, insulating means on said coil engageable with said work piece adjacent said one portion for holding it in alignment with and in a predetermined spaced and fixed relation to said coil, and means mounting said work holder and said coil in a predetermined relation to each other and for floating movement of the work holder relative to said coil in any direction in a predetermined plane.

2. In a brazing apparatus, the combination of a split induction heating coil having a pair of coil sections movable to a closed position for heating one portion of a work piece, a work holder engageable with another portion of said work piece for supporting said work piece within said coil, insulating members on said coil sections engageable with said work piece adjacent said one portion, means for clamping said coil sections in closed position with the insulating members holding said one portion of the work piece against horizontal movement and in a predetermined spaced relation to said coil, a base, ball bearing means mounting said work holder on said base for floating horizontal movement in any direction, means on said base for limiting the horizontal movement of said work holder and preventing vertical movement thereof, and means for supporting said coil and said base in fixed relation to each other during the brazing operation.

3. A floating work holder comprising an upper member having a seat for supporting a work piece thereon, a lower member, roller means for supporting said upper member on said lower member for horizontal movement in any direction, and means on one of said members for limiting the extent of horizontal movement of said upper member relative to said lower member.

4. A floating work holder comprising an upper member having a seat for supporting an article thereon, a lower member, means for supporting said upper member on said lower member for movement in any direction in a given plane, and means for preventing relative movement between said members transversely of said plane.

5. A floating work support comprising an upper member having an upper surface for supporting an article thereon, a base, roller means for supporting said member on said base for horizontal movement in any direction, means on said base for limiting the extent of horizontal movement of said upper member, and means for preventing relative vertical movement between said members.

6. A floating work holder comprising a base having a circular wall, a circular plate having a seat for supporting an article thereon and having an annular horizontal flange disposed within and in horizontally spaced relation to said circular wall, a ring secured to said wall in overlapping relation to the horizontal flange on said circular plate and disposed below the upper surface thereof, and ball bearing means disposed between said flange and the ring and between the flange and the base for supporting said plate for horizontal movement in any direction.

7. A floating work holder comprising an upper member having a seat for supporting a work piece thereon, a base, means for supporting said upper member on said base member for horizontal movement in any direction, and resilient means for yieldably retaining said upper member in and returning it to a normal position on said base.

References Cited in the file of this patent

UNITED STATES PATENTS 2,211,186    Weston _____ Aug. 13, 1940
2,368,809    Denneen et al. _____ Feb. 6, 1945